US012421782B2

(12) United States Patent
Soderqvist

(10) Patent No.: US 12,421,782 B2
(45) Date of Patent: Sep. 23, 2025

(54) TESTING SYSTEM FOR SWING DOOR-BASED ENTRANCE SYSTEM

(71) Applicant: Assa Abloy Entrance Systems AB, Landskrona (SE)

(72) Inventor: Sven-Gunnar Soderqvist, Vallakra (SE)

(73) Assignee: Assa Abloy Entrance Systems AB, Landskrona (SE)

(*) Notice: Subject to any disclaimer, the term of this patent is extended or adjusted under 35 U.S.C. 154(b) by 136 days.

(21) Appl. No.: 17/637,281

(22) PCT Filed: Sep. 9, 2020

(86) PCT No.: PCT/EP2020/075163
§ 371 (c)(1),
(2) Date: Feb. 22, 2022

(87) PCT Pub. No.: WO2021/052829
PCT Pub. Date: Mar. 25, 2021

(65) Prior Publication Data

US 2022/0282545 A1 Sep. 8, 2022

(30) Foreign Application Priority Data

Sep. 16, 2019 (SE) .................................... 1930295-9

(51) Int. Cl.

| | |
|---|---|
| ***E05F 15/70*** | (2015.01) |
| ***E05F 15/40*** | (2015.01) |
| ***E05F 15/63*** | (2015.01) |

(52) U.S. Cl.
CPC .............. *E05F 15/63* (2015.01); *E05F 15/40* (2015.01); *E05F 15/70* (2015.01); (Continued)

(58) Field of Classification Search
CPC ............ E05F 15/63; E05F 15/70; E05F 15/40
See application file for complete search history.

(56) References Cited

U.S. PATENT DOCUMENTS 5,018,304 A * 5/1991 Longoria ................ E05F 15/63 49/340
5,884,237 A * 3/1999 Kanki ................... E05F 15/643 702/108

(Continued)

FOREIGN PATENT DOCUMENTS

WO 2015175614 11/2015
WO 2019025523 2/2019

OTHER PUBLICATIONS

International Search Report and Written Opinion in PCT/EP2019/075163, mailed Dec. 17, 2020.
Swedish Search Report in 1930295-9, mailed Mar. 17, 2020.

*Primary Examiner* — Daniel J Troy
*Assistant Examiner* — Susan M. Heschel
(74) *Attorney, Agent, or Firm* — Wissing Miller LLP

(57) ABSTRACT

An entrance system (1) comprising a swing door member (10) having a door leaf (12), and an automatic door operator (30) is provided. The automatic door operator (30) has a motor (34) capable of causing movement of the door member (10), a controller (31) for controlling operation of the motor (34), and the automatic door operator (30) being operable in a testing mode (60) and an operational mode, wherein the controller (31) is configured, in the testing mode (60), to automatically determine at least one test parameter; and causing an action in response to the determined test parameter.

14 Claims, 9 Drawing Sheets

(52) U.S. Cl.
CPC ..... *E05Y 2201/41* (2013.01); *E05Y 2201/422* (2013.01); *E05Y 2201/434* (2013.01); *E05Y 2400/3013* (2024.05); *E05Y 2400/458* (2013.01); *E05Y 2400/50* (2013.01); *E05Y 2900/132* (2013.01)

(56) References Cited

U.S. PATENT DOCUMENTS

| | | | | | |
|---|---|---|---|---|---|
| 5,913,763 | A * | 6/1999 | Beran | E05F 15/63<br>74/89.17 |
| 8,169,169 | B2 * | 5/2012 | Hass | E05F 15/63<br>361/84 |
| 2003/0213092 | A1 * | 11/2003 | Fischbach | E05F 3/102<br>16/52 |
| 2017/0328108 | A1 * | 11/2017 | Long | E05F 15/70 |
| 2018/0371817 | A1 * | 12/2018 | Yulkowski | G08B 21/18 |

* cited by examiner

| Size | Max. door width (mm) | Max. door weight (kg) |
|---|---|---|
| 1 | 750 | 20 |
| 2 | 850 | 40 |
| 3 | 950 | 60 |
| 4 | 1100 | 80 |
| 5 | 1250 | 100 |
| 6 | 1400 | 120 |
| 7 | 1600 | 160 |

*Fig 6a*

| Size | Max. door width (mm) | Max. door weight (kg) | Opening moments, max values (Nm) for angles between 0° and 60°. |
|---|---|---|---|
| 1 | 750 | 20 | 26 |
| 2 | 850 | 40 | 36 |
| 3 | 950 | 60 | 47 |
| 4 | 1100 | 80 | 62 |
| 5 | 1250 | 100 | 83 |
| 6 | 1400 | 120 | 134 |
| 7 | 1600 | 160 | 215 |

*Fig 6b*

| Size | Max. door width (mm) | Max. door weight (kg) | Closing moment (Nm) | | | |
|---|---|---|---|---|---|---|
| | | | Minimum value, for angles 0°-4° | Maximum value, for angles 0°-4° | Minimum value, for angles 88°-92° | Minmum value, for any other angle |
| 1 | 750 | 20 | 9 | <13 | 3 | 2 |
| 2 | 850 | 40 | 13 | <18 | 4 | 3 |
| 3 | 950 | 60 | 18 | <26 | 6 | 4 |
| 4 | 1100 | 80 | 26 | <37 | 9 | 6 |
| 5 | 1250 | 100 | 37 | <54 | 12 | 8 |
| 6 | 1400 | 120 | 54 | <87 | 18 | 11 |
| 7 | 1600 | 160 | 87 | <140 | 29 | 18 |

*Fig 6c*

| Size | Max. door width (mm) | Max. door weight (kg) | Door closing efficency, min values (%) for angles between 0° and 4°. |
|---|---|---|---|
| 1 | 750 | 20 | 50 |
| 2 | 850 | 40 | 50 |
| 3 | 950 | 60 | 55 |
| 4 | 1100 | 80 | 60 |
| 5 | 1250 | 100 | 65 |
| 6 | 1400 | 120 | 65 |
| 7 | 1600 | 160 | 65 |

*Fig 6d*

TESTING SYSTEM FOR SWING DOOR-BASED ENTRANCE SYSTEM

This application is a 371 of PCT/EP2020/075163, filed on Sep. 9, 2020, published on Mar. 25, 2021 under publication number WO 2021/052829, which claims priority benefits from Swedish Patent Application No. 1930295-9, filed on Sep. 16, 2019, the disclosure of which is incorporated herein by reference.

TECHNICAL FIELD

The present invention generally relates to entrance systems having a swing door member and an automatic door operator for causing movement of the swing door member. More specifically, the present invention relates to a testing system for such entrance systems.

BACKGROUND

Entrance systems having automatic door operators are frequently used for providing automatic opening and closing of one or more movable door members in order to facilitate entrance and exit to buildings, rooms and other areas. The door members are often swing doors. Other types of entrance systems have, for instance, sliding door or revolving doors.

In swing door-based entrance systems, there is at least one swing door member having a door leaf. The door leaf is pivotally hinged to a door frame to allow opening of the swing door member from a closed position to an open position, as well as for allowing closing of the swing door member from the open position to the closed position. A motorized automatic door operator is included in the entrance system and is capable of causing opening of the swing door member. A linkage in the form of a mechanical arm system connects the automatic door operator to the door leaf of the swing door member.

The purpose of automatic door operators in swing door-based entrance systems is to provide automatic opening of the swing door member in various possible applications. Such applications include, for instance, facilitating a disabled person's access to his or her private home, providing access through entrance ports or internal doors at healthcare buildings, office premises, industries or retail stores, providing comfort access to hotel rooms, etc.

Swing door-based entrance systems may also be used in fire door applications. In such applications, the swing door member has a fire proof door leaf having a fire resistant core made of suitable materials. Fire doors are arranged to stop or delay the transfer of thermal energy, i.e. heat, from one side of the door to another side. Moreover, the automatic door operator comprises a forced close arrangement which is adapted to provide mechanical energy from a loaded spring via a transfer mechanism to the linkage, so as to cause forced closing of the door leaf with respect to the door frame in the event of a fire alarm.

The automatic door operator causes opening of the swing door member by an electric motor which generates torque that is transferred to the swing door member via the linkage. The operation of the electric motor is controlled by a controller in the automatic door operator. Since an entrance system with an automatically operated swing door member is a potentially hazardous environment for people and objects that might be hit or jammed by the moving swing door member, an entrance system needs to satisfy various technical standard requirements, the purpose of which is to safeguard that the operation of the swing door member is performed in an accurately controlled manner.

In order for the controller of the automatic door operator to cause an accurately controlled movement of the swing door member all the way from a shut closed position to a swung open position, the controller needs various control input data. A revolution counter at the motor shaft of the electric motor provides one such type of control input data. The controller also needs other control input data, such as the inertia of the swing door member, the friction in the transmission (gear box) of the electric motor, and the spring force of the forced close arrangement when applicable. Such control input data may be established by manual settings or be obtained in a learn cycle, since they are either a constant value or generally linear in nature (i.e., are linearly dependent on the door leaf angle).

In addition to this, the controller of the automatic door operator also has to take into account the torque transfer characteristics of the linkage that connects the automatic door operator and its electric motor and transmission with the door leaf of the swing door member. The torque transfer characteristics of the linkage have a non-linear nature that makes the controller's task more complex. The torque transfer characteristics of the linkage will depend on many factors, such as for instance whether the swing door member is mounted for pull actuation or push actuation by the automatic door operator, the distance between an outgoing spindle of the automatic door operator and a hinge axis of the swing door member, the dimensions and mass of the door leaf, etc.

There is a risk that the critical parts of the entrance system (e.g. the automatic door operator, the linkage and the door leaf being hinged to the door frame) are mounted in a way that does not comply with the mounting requirements that were intended by a certain dip switch setting. This may be due to human errors or sloppiness in the installation procedure, or because the building in which the entrance system is installed will be subject to restrictions in terms of margins, dimensions, available space, etc.

Because of these shortcomings, the entrance system might fail to satisfy the technical standard requirements. In turn, this may increase the risk for accidents, malfunction and excessive wear of the components of the entrance system.

Accordingly, the present inventor has realized that there is room for improvements in the field of swing door-based entrance systems.

SUMMARY

An object of the present invention is therefore to provide one or more improvements when it comes to determining and/or verifying if safety standard requirements are fulfilled.

In a first aspect, an entrance system is provided. The entrance system comprises a swing door member having a door leaf, and an automatic door operator. The automatic door operator comprises a motor capable of causing movement of the door member, a controller for controlling operation of the motor, and the automatic door operator being operable in a testing mode and an operational mode. The controller is configured, in the testing mode to automatically determine at least one test parameter, and causing an action in response to the determined test parameter.

The provision of such an entrance system will solve or at least mitigate one or more of the problems or drawbacks identified in the background section of this document, as will be clear from the following detailed description section and the drawings.

In one embodiment, the entrance system further has a sensor unit, the sensor unit comprising a door angle sensor, and wherein the controller is further configured, in the testing mode to cause movement of said door leaf between a shut closed position of said door leaf and a swung open position of said door leaf, obtain measurement readings of said door angle sensor during said movement, and determine different door leaf angles from the obtained measurement readings. The sensor unit may form part of the swing door member, and may for example be mounted to the door leaf.

In an alternative embodiment, the controller is further configured, in the testing mode to cause movement of said door leaf between a shut closed position of said door leaf and a swung open position of said door leaf, obtain measurement readings relating to the door angle during said movement, and determine different door leaf angles from the obtained measurement readings.

In one embodiment, the system further comprises a linkage connected to the automatic door operator and the door leaf for transferring torque generated by the motor to the door leaf.

In one embodiment the entrance system further comprising a lock assembly configured of putting the entrance system in a locked or unlocked position. The controller may then further be configured to control said motor to initiate a movement of said door leaf between a shut closed position of said door leaf and a swung open position of said door leaf, and evaluate if the motor causes movement of the door leaf when the lock assembly is in a locked position. The at least one test parameter may be based on the result of the evaluation.

A second aspect of the present invention is a method of operating an entrance system which comprises a swing door member having a door leaf, and which furthermore comprises an automatic door operator having a motor capable of causing movement of the door member, and a controller for controlling operation of the motor. The method involves operating the automatic door operator in a testing mode which involves automatically determining at least one test parameter, and causing an action in response to the determined test parameter.

The provision of such a method will solve or at least mitigate one or more of the problems or drawbacks identified in the background section of this document, as will be clear from the following detailed description section and the drawings.

In one embodiment, the swing door member further has a sensor unit mounted to the door leaf and the sensor unit comprising a door angle sensor. The testing mode may further involve, in a step before automatically determining at least one test parameter, controlling said motor to cause movement of said door leaf between a shut closed position of said door leaf and a swung open position of said door leaf, obtaining measurement readings of said door angle sensor during said movement; and determining different door leaf angles from the obtained measurement readings.

In one embodiment, the step of automatically determining at least one test parameter is at least based on the determined door leaf angles.

In yet a further aspect, an egress door system is provided. The system comprises a swing door member having a door leaf, an exit device for receiving a pushing force exerted toward the door by a person attempting to egress through the door member, and a controller, wherein controller is operable in a testing mode. The controller is configured, in the testing mode, to automatically determine at least one test parameter, and causing an action in response to the determined test parameter.

Embodiments of the invention are defined by the appended dependent claims and are further explained in the detailed description section as well as in the drawings.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

A reference to an entity being "designed for" doing something, or "capable of" doing something in this document is intended to mean the same as the entity being "arranged for", "configured for" or "adapted for" doing this very something, and vice versa.

BRIEF DESCRIPTION OF THE DRAWINGS

Objects, features and advantages of embodiments of the invention will appear from the following detailed description, reference being made to the accompanying drawings.

FIGS. 6*a-d* illustrates different relationships between system parameters and operation data gathered from the automatic door operator.

DETAILED DESCRIPTION OF EMBODIMENTS

Figure 1:
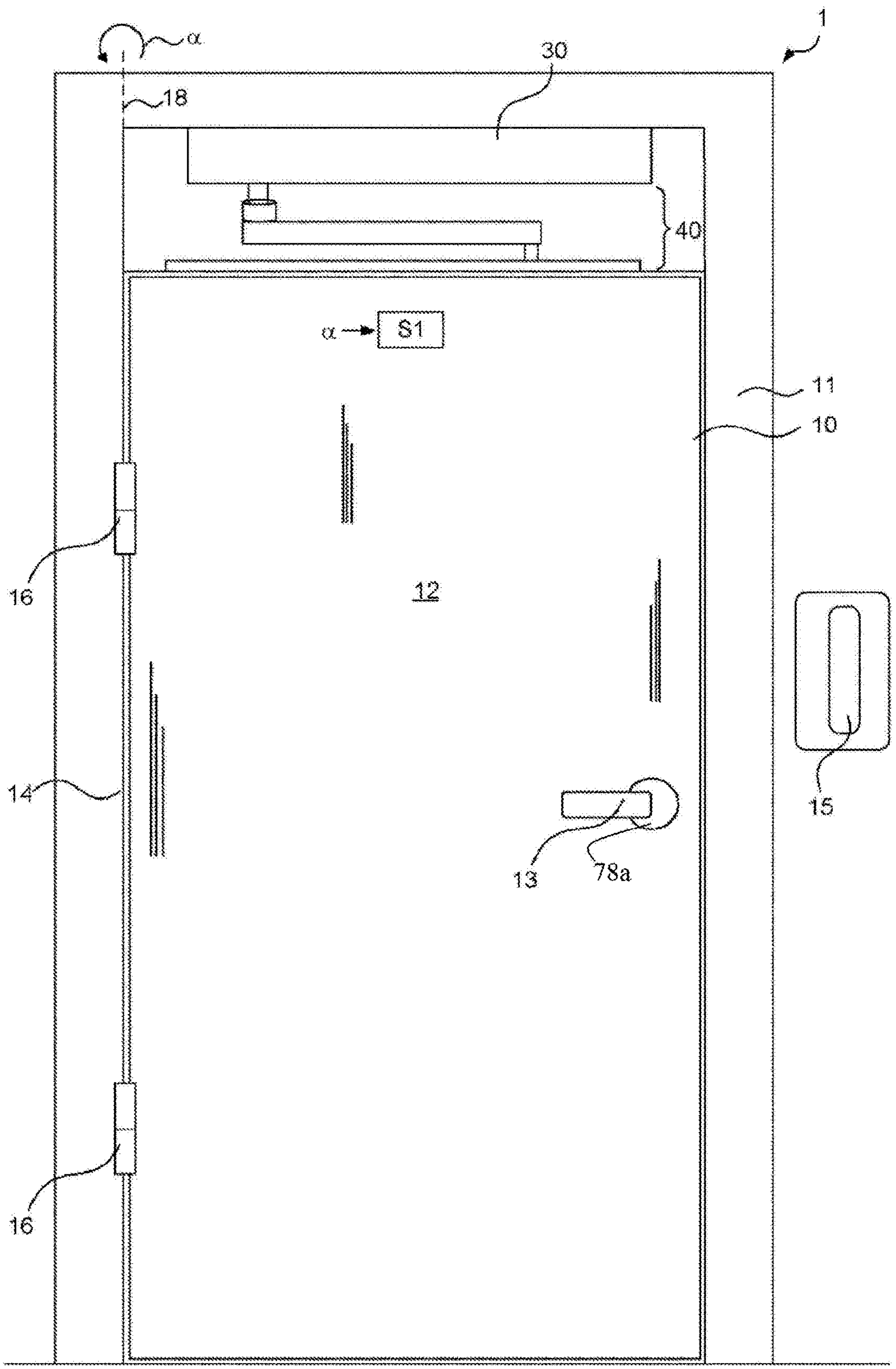
FIG. 1 is a schematic block diagram of one embodiment of an entrance system having a swing door member, an automatic door operator and a sensor unit.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

FIG. 1 is a schematic front view of a swing door-based entrance system. The entrance system 1 comprises a swing door member 10 having a door leaf 12.

The swing door member 10 is pivotally supported at a vertical edge 14 by hinges 16 for allowing opening of the swing door member 10 from a closed position to an open position, as well as for allowing closing of the swing door member 10 from the open position to the closed position. The swing door member 10 is hence supported by a door frame 11 for pivotal motion around a rotational axis 18 which is coincident with the hinges 16.

The entrance system 1 comprises a motorized automatic door operator 30 capable of causing opening of the swing door member 10. A linkage (arm mechanism) 40 connects the automatic door operator 30 to the door leaf 12 of the swing door member 10. The door operator 30 may be arranged in conjunction with the door frame 11 and is typically a concealed overhead installation in or at the door frame 11 (hence, the linkage mechanism 40 and automatic door operator 30 are normally not as visible to the naked eye as appears to be the case in FIG. 1).

The automatic door operator 30 may be triggered by sensor equipment in the entrance system 1. Such sensor equipment may include activity sensors (e.g. IR or radar based sensors) which are adapted to detect an approaching user and accordingly trigger the automatic door operator 30 to open the swing door member 10. Alternatively, the automatic door operator 30 may be triggered by a user actuating a door-open push button 15, or similar actuator. The entrance system 1 will typically also allow the user to open or close the swing door member 10 by pulling or pushing a door handle 13 by manual force, i.e. without using the motorized automatic door operator 30.

The automatic door operator 30 may provide automatic opening of the swing door 10 in various possible applications. Such applications include, for instance, facilitating a disabled person's access to his or her private home, providing access through entrance ports or internal doors at health-care buildings, office premises, industries or retail stores, providing comfort access to hotel rooms, etc. The automatic door operator 30 may also be used in fire door applications, as previously explained in the background section of this document.

Figure 3:
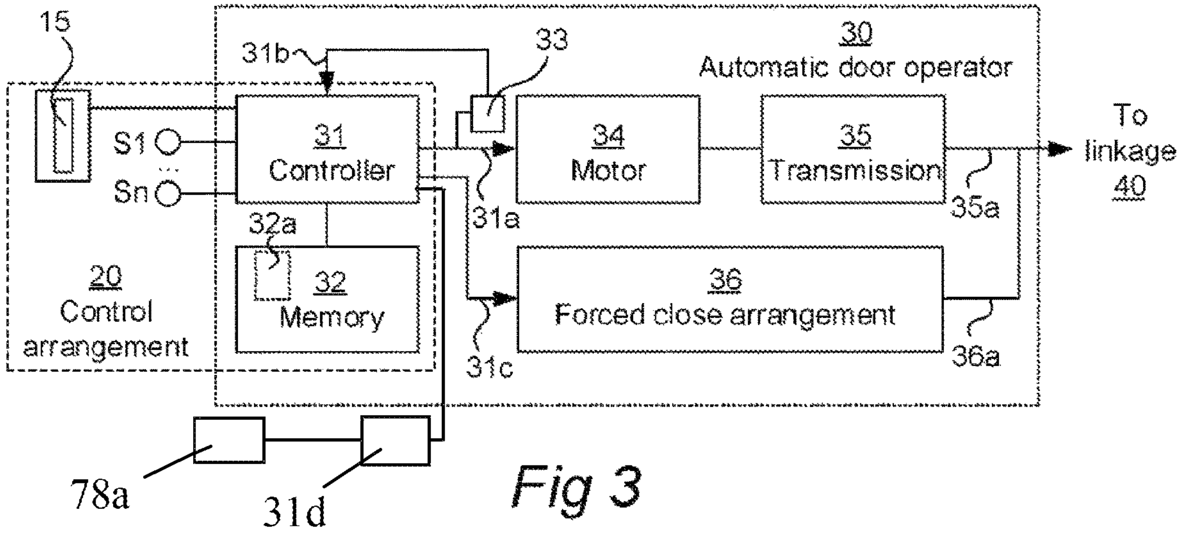
FIG. 3 is a schematic block diagram of an automatic door operator according to one embodiment.

The entrance system 1 may be provided with a lock assembly 78*a*, as shown in FIG. 3, that puts the swing door member 10 in a locked or unlocked position. The lock assembly is connected to the power supply 31*d* of the system. The lock assembly preferably comprises a lock mechanism and an electric strike assembly.

The lock assembly 78*a* could either be of a fail-safe lock type or a fail secure lock type. When the power supply 31*d* fails or is interrupted (such as in the case of fire), a fail-safe lock will be opened to allow people to exit through the door. A fail secure lock stays locked even if the power is interrupted or fails. It is generally desirable that the electrically controlled lock assembly respond to an electricity supply failure in a manner that suits the location in which the assembly is installed. More specifically in the event of an electricity supply failure it is generally desirable for the lock assembly to be operable in either a fail safe or fail secure mode, so that the locking means is rendered inoperable or operable respectively. It is also generally desirable that the lock assembly be easily adjustable between fail safe and fail secure when being installed.

Different kinds of lock assemblies could be used, depending on the type of door system and the intended use. One type of lock assembly is an electrically controlled strike assembly generally mounted on or in the frame surrounding the door. In particular the strike assembly is often mounted in a cavity formed in a vertical frame element A bolt, most often a latch bolt, is located on the door so as to engage a strike element, referred to hereinafter as a keeper, of the electric strike assembly when the door is in the closed position. While a handle may be provided, the handle is not operably connected to the latch bolt to enable its retraction to a release position. Instead where the strike assembly is in an unlocked condition the keeper is moved to a release position by the user applying a force to the door, possibly via the handle, to move the door from the closed position. Where the strike assembly is in a locked condition, the user must unlock the strike assembly before the keeper can be moved towards the release position.

The strike assembly includes a locking means which when operable restrains the keeper from moving towards the release position. The locking means generally has a detent which moves along a path from an active position to an inactive position to render the locking means inoperable. In the case of the strike assembly the detent is in the form of one or more pins that are moveable along a path defined by a bore extending between the keeper and a housing supporting the keeper. When the locking means is operable the one or more gins extend across a shear line between the keeper and the housing, to stop the keeper from being moved relative to the housing. An electrical controller, generally a solenoid or a motor and gearing arrangement, can be utilized to move the one or more pins axially of the bore so that they do not extend across the shear line and thereby render the locking means inoperable.

Other types of lock assembly which are used to secure a door in a closed position include a mortice lock assembly or a rim lock assembly. These types of lock assemblies include a bolt that is movable relative to a housing between an extended locked position and a retracted release position. A hand operable actuator operable by movement of a turn knob or lever is generally used to at least retract the bolt from the extended position. A detent is included that when held in an active position renders the bolt immovable or the actuator inoperable. An electrical controller such as a solenoid or motor and gearing arrangement can be utilized to move the detent along a path from the active position.

The swing door member 10 furthermore has a sensor unit mounted to the door leaf 12. The sensor unit comprises a door angle sensor S1 capable of measuring a door leaf angle $\alpha$ of the door leaf 12. In embodiments described herein, the door angle sensor S1 comprises at least one of an accelerometer and a gyroscope.

Figure 4:
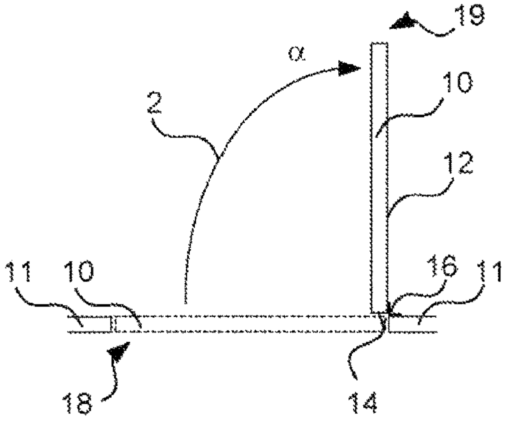
FIG. 4 illustrates movement of the swing door member from a shut closed position to a swung open position.

FIG. 4 illustrates the opening of the swing door member 10 in one embodiment of the entrance system 1 from a shut closed position 18 to a swung open position 19. The opening movement is indicated by an arrow 2. As can be seen in FIG. 4, during the opening 2 of the swing door member 10, the door leaf angle $\alpha$ as measured by the door angle sensor S1 will span from about 0° to about 90°. In other embodiments, the swung open position may be at a door leaf angle $\alpha$ different from about 90°, such as for instance about 180°.

Figure 5:
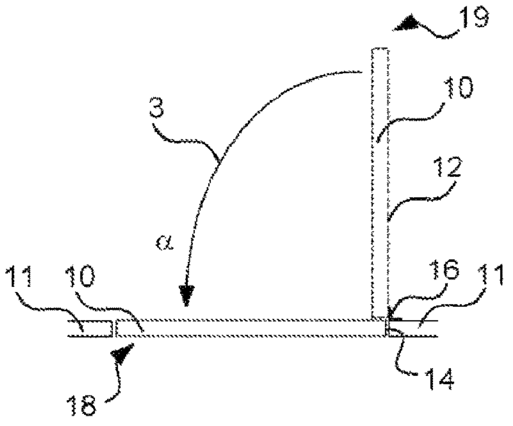
FIG. 5 illustrates movement of the swing door member from the swung open position to the shut closed position.

FIG. 5 correspondingly illustrates the closing of the swing door member 10 of the entrance system 1 from the swung open position 19 to the shut closed position 18. The closing movement is indicated by an arrow 3. As can be seen in FIG. 5, during the closing 3 of the swing door member 10, the door leaf angle $\alpha$ as measured by the door angle sensor S1 will span from about 90° to about 0°. In other embodiments where the swung open position is at a door leaf angle $\alpha$ different from about 90°, such as for instance about 180°, the door leaf angle $\alpha$ as measured by the door angle sensor S1 will of course start spanning from such other door leaf angle $\alpha$.

Figure 2:
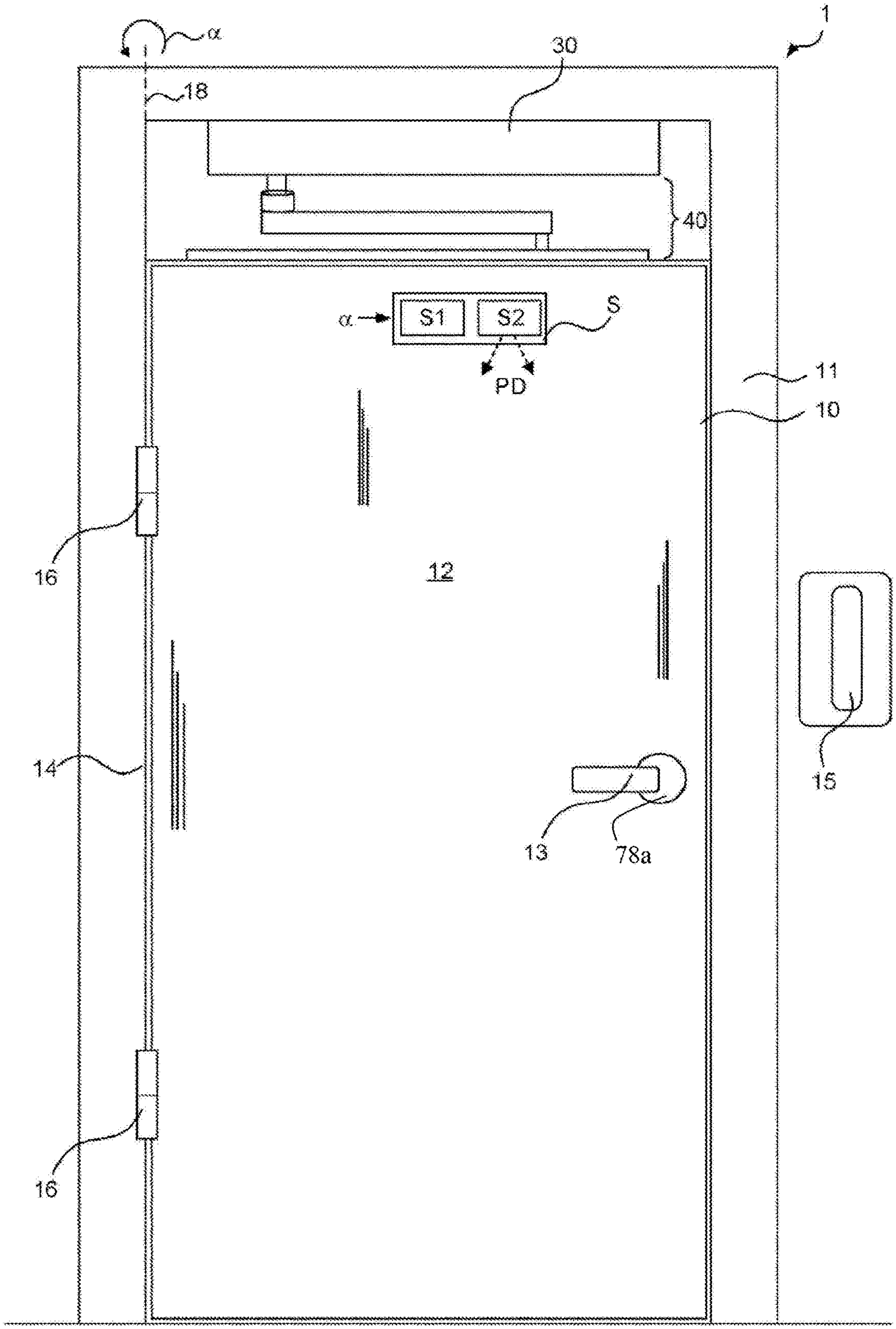
FIG. 2 is a schematic block diagram of another embodiment of an entrance system having a swing door member, an automatic door operator and a sensor unit.

To avoid dangerous situations where a present, approaching or departing person or object (including but not limited to pets or articles brought by the person) might be hit or jammed by the door leaf 12 of the swing door member 10, a safety sensor may be provided. Hence, in some embodiments, in addition to the door angle sensor S1, the sensor unit mounted to the door leaf 12 comprises a safety sensor for monitoring a zone at or near the door leaf 12 for presence or activity of a person or object. This can be seen for sensor unit S in the entrance system 1 shown in FIG. 2; the sensor unit S comprises the door angle sensor S1 as well as a safety sensor S2. Hence, in one embodiment, the sensor unit S comprises, in addition to said door angle sensor S1, a safety sensor S2 for monitoring a zone at or near the door leaf 12 for presence or activity of a person or object. Advantageously, the sensor unit S contains both the door angle sensor S1 and the safety sensor S2 within a common single device housing. The sensor unit S is mounted at an appropriate position on the surface of the door leaf 12. As can be seen in FIG. 2, such a position is often at an uppermost part of the door leaf 12.

The purpose of the safety sensor S2 is to monitor a zone, or volume, at or near the door leaf 12 for presence or activity of a person or object. If a person or object is detected in the monitored zone, the automatic door operator 30 shall not be allowed to move the swing door member 10 in a direction in which the swing door member 10 may hit or jam that person or object. Accordingly, the automatic door operator 30 is configured to receive monitoring data from the safety sensor S2. If the monitoring data indicates presence or activity of a person or object in the monitored zone, the automatic door operator 30 is configured to refrain from driving a motor of the automatic door operator 30 to cause movement of the swing door member 10, and/or force the motor to stop an ongoing movement of the swing door member 10.

Reference is now made to FIG. 3 which illustrates an embodiment of the automatic door operator 30 in more detail. The automatic door operator 30 comprises a motor 34, typically an electrical motor, being connected to a transmission 35. An output shaft 35*a* of the transmission 35 rotates upon activation of the motor 34 and is connected to the linkage 40. The linkage 40 translates the motion of the output shaft 35*a* into an opening motion of the door leaf 12 with respect to the door frame 11 (c.f. opening movement 2 in FIG. 4).

The automatic door operator 30 also comprises a control arrangement 20 including a controller 31 which is configured for performing different functions of the automatic door operator 30. One or more of these functions relates to opening of the door leaf 12 with respect to the door frame 11. Accordingly, the controller 31 has a control output 31*a* connected to the motor 34 for controlling the actuation thereof.

In addition to the controller 31, the control arrangement 20 comprises a number n of sensor functions, including or consisting of the aforementioned door angle sensor S1, safety sensor S2, activity sensor and door-open push button 15. The sensor functions are operatively connected with the controller 31 to report detection results or measurement readings to the controller 31.

A revolution counter 33, such as an encoder or other angular sensor, is provided at the motor 34 to monitor the revolution of a motor shaft of the motor 34. The revolution counter 33 is connected to an input 31*b* of the controller 31. The controller 31 is configured to use one or more readings of the revolution counter 33, typically a number of pulses generated as the motor shaft rotates, for determining a current angular position, e.g. door leaf angle $\alpha$, of the door leaf 12 of the swing door member 10.

The controller 31 may be implemented in any known controller technology, including but not limited to microcontroller, processor (e.g. PLC, CPU, DSP), FPGA, ASIC or any other suitable digital and/or analog circuitry capable of performing the intended functionality.

The controller 31 has an associated memory 32. The memory 32 may be implemented in any known memory technology, including but not limited to E(E)PROM, S(D) RAM or flash memory. In some embodiments, the memory 32 may be integrated with or internal to the controller 31. As seen at 32*a*, the memory 32 may store program instructions for execution by the controller 31, as well as temporary and permanent data used by the controller 31.

The embodiment of the automatic door operator 30 shown in FIG. 3 is intended for fire door usage and therefore includes a forced close arrangement 36. (It is to be noticed that while the present invention is believed to be advantageous in fire door applications, the invention may alternatively be used in applications which do not relate to fire door usage.)

The forced close arrangement 36 is adapted to provide mechanical energy via a transfer mechanism to the linkage 40, so as to cause forced closing of the door leaf 12 with respect to the door frame 10 in the event of a fire alarm. In the disclosed embodiment, the forced close arrangement 36 comprises a helical compression spring.

During opening of the swing door member 10 by the torque generated by the motor 34, the compression spring is tensioned by the rotation of the output shaft 35*a*, as can be seen at 36*a*. During the forced closing cycle, the accumulated spring force of the compression spring is transferred to the output shaft 35 at 36*a* by means of the transfer mechanism, which in the disclosed embodiment includes a pressure roller that acts on a cam curve being connected to the output shaft 35*a*. In other embodiments, the forced close arrangement 36 may comprise a different kind of spring, and its transfer mechanism may comprise a different kind of mechanism.

The controller 31 may receive an external fire alarm signal via a control input and generate a control signal 31*c* to the forced close arrangement 36, so as to cause release of the accumulated spring force.

As will now be described with reference to FIGS. 6 and 7, the automatic door operator 30 is operable in a testing mode 60 and in an operational mode. The configuration mode 60 is preferably used during installation and/or configuration of the automatic door operator 30, but could also be used on existing door operators 30 to test or verify the configuration/installation. The testing mode makes it easier for the installer, operator or user to test that the door operators 30 fulfill the safety requirements and to re-configure the door operator 30 if the safety requirements are not fulfilled.

As soon will be described more in detail, the established information may for example include the closing moment 72 (closing torque), opening moment 74 (opening torque), door closing efficiency 76, the spring force (when a forced close arrangement 36 is provided) and/or parameters of the lock assembly 78.

In the testing mode 60, the controller 31 of the automatic door operator 30 is configured to establish information required to test that the installation and/or configuration of the automatic door operator 30 has been successful. An installation and/or configuration is successful if the relevant safety standard requirements are met.

Different sized door leafs 12 needs to fulfill different safety requirements and require different power sized automatic door operators 30. The door width of the door leaf 12 can be measured in mm, and may vary considerable in size. For example, the door leaf 12 could have a width of around 750 mm, or be as wide as 1600 mm. Additionally, the weight of the door may differ significantly, for example ranging from less than 20 kg to up to 160 kg. It should be noted that the term "width" used herein is the length of the door in a horizontal direction and should not be seen as the thickness of the door.

The "power size", "size of closer force" or "door closer power size" of a door operator 30 can be classified into a number of different sizes, typically ranging from 1 up to 6 or 7, where size 1 is the door operator 30 with the least power. Some door operators 30 has a fixed power size, whereas others have an adjustable power size. The wider and heavier the door leaf 12 is, the greater the force required controlling it and thus a higher power size is needed. Fire doors are typically arranged with door closer power size that ranges between 3-7. Due to the low closing moments door closer size 1 and 2 are not considered suitable for use on fire/smok door assemblies. Door closers having an adjustable closing force shall preferably be capable of adjustment at least to power size 3.

Figure 7:
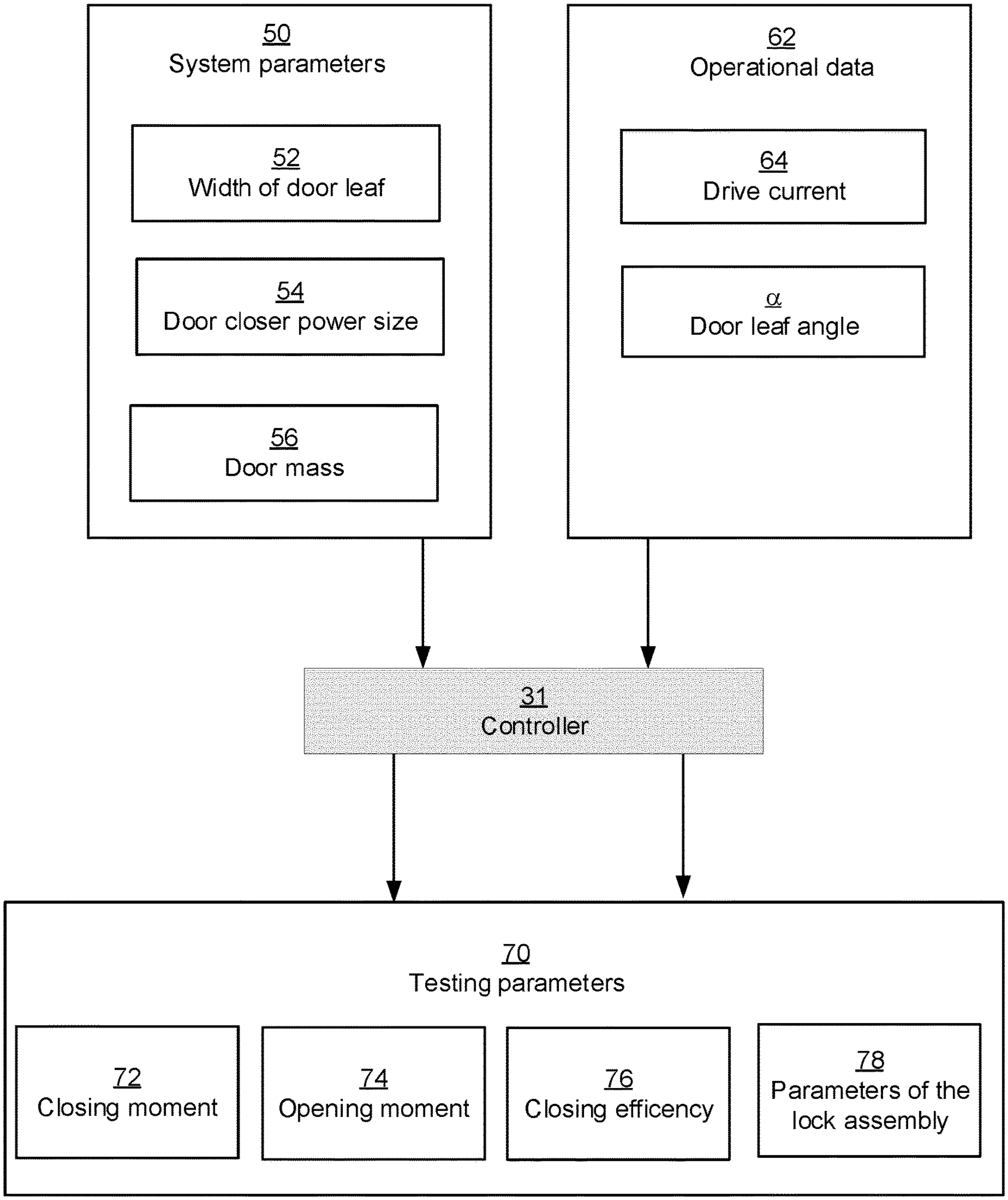
FIG. 7 illustrates a configuration mode of the automatic door operator.

The above parameters, width 52 of the door leaf, the door closer power size 54 and the door mass 56 can be seen as system parameters 50 (as shown in FIG. 7). These parameters 50 may all be related to each other and/or to the safety requirements. An exemplified relationship between the power size, the maximum door weight and the maximum door width is illustrated in FIG. 6*a*. In this example, one can see that power size of 3 should be used for a door having a weight between −41-60 kg and a door leaf 12 width of 851-950 mm.

As previously stated, different sized doors needs to fulfill different safety requirements, for example relating to closing moment (closing torque), opening moment (opening torque) and door closing efficiency. The closing moment, opening moment and door closing efficiency are all dependent of the door leaf angle α, and different thresholds may exist for different angles α. Moreover, it may be beneficial to test if different parameters of the lock assembly are fulfilled, for example by checking if a fail secure electric strike is used. Another lock assembly parameter that can be useful for the operator is if the latch reaches a correct position in the electric strike at closed position, this is preferably checked booth at power on and off.

FIGS. 6*b*-*d* illustrates different exemplified relationship between different system parameters 50 and different door leaf angels α.

FIG. 6*b* illustrates the relationship between the system parameters 50 and the maximum allowed opening moment. The opening moment is preferably determined at a plurality of different door leaf angles α. For example, the opening moment may be determined for angles between 0° and 60° and compared against the maximum values allowed.

FIG. 6*c* illustrates the relationship between the system parameters 50 and the minimum and maximum allowed closing moment. The closing moment may be determined for a plurality of angles. For example, the closing moment may be determined for angles between 0° and 4°, for angles between 88° and 92°, as well as any other door leaf angles α of opening. The different set of angles often has different minimum and maximum moment values (Nm) that needs to be fulfilled.

FIG. 6*d* illustrates the relationship between the system parameters 50 and the minimum allowed door closing efficiency. In this example, the door closing efficiency (measured in %) is determined for the door leaf angles α between 0° and 4°.

It should be understood that the values of the tables shown in FIGS. 6*a*-*d* are mere examples, taken from the European Standard EN 1154, and that the inventive concept could be applied to other safety requirements having other relationships as well.

FIG. 7 illustrates possible information needed in order to establish if the automatic door operator 30 is installed and/or configured such that it fulfills the safety requirement for that specific entrance system 1.

The controller 31 is configured to receive information regarding at least one of system parameter(s) 50 and operational data 62. The system parameters 50 have already been discussed, and may relate to the width 52 of the door leaf, the door closer power size 54 and/or the door mass 56.

The operational data 62 may comprise information relating to the operation of the motor 32, such as for example the drive current 64. Additionally or alternatively, the operational data 62 may comprise information relating to the door leaf angle α.

The at least one of system parameters 50 and operational data 62 are evaluated by the controller 31 in order to determine test parameters 70. The test parameters 70 may relate to the maximum and/or minimum closing moment 72, the maximum and/or minimum opening moment 74, the maximum and/or minimum closing efficiency 76, and/or parameters of the lock assembly 78.

The system parameters 50 can either be inputted manually by the operator/installer or be pre-stored in the memory 32 of the control arrangement 20. In a preferred embodiment, at least some of the information regarding the system parameters 50 are pre-stored in the memory 32. The pre-stored information may for example be the width 52 of the door leaf, the door closer power size 54 and/or the door mass 56. In one embodiment the width 52 of the door leaf and the door mass 56 is pre-stored in the memory 32, and the controller 31 is configured to determine the door closer power size 54 based on the stored information of the width 52 and the mass 56.

In an embodiment where the operator/installer manually inputs one or more system parameters 50, this is preferably done using a display or any other kind of input device (not shown) being in operative communication with the controller 31. The input device may be arranged in conjunction to the control arrangement 20, or be arranged as an external device. This will be described more in detail with reference to FIG. 9.

The controller 31 is configured to determine, or establish, at least one test parameter based on at least one system parameter 50 and/or at least one operational data 62. If the test parameters represent closing moment, opening moment and/or the closing efficiency, it is preferred if both system parameters 50 and operational data 62 are used. In a more preferred embodiment, the width 52 of the door leaf, the door closer power size 54, the door mass 56, the drive current 64 and at least one door leaf angle are used to determine the test parameter(s).

The mass moment of inertia for a door may be calculated as follows: mass moment of inertia=((Width)$^2$*(mass of the door))/3. Hence the mass moment of inertia is calculated using the width of the door and the mass of the door.

The moment, or torque, can in a simplified manner be described as the linear force multiplied with a distance multiplied with sinus of an angle. The angel is the angle between the force and the distance, and the distance is the distance between the axis of rotation and the point where the linear force is applied.

Hence, when determining the moment, it is preferred if the dimensions of the door leaf 12 is known, as well as knowing the force applied for a specific door leaf angle α.

As was discussed with reference to FIGS. 6*b*-*d*, it is possible that the test parameter(s) needs to be determined for a range of door leaf angles α. The door angle sensor S1 thus preferably measures a large span of angles, for example spanning from about 0° to about 90° or 180°.

The parameters of the lock assembly 78 are preferably checked in a simplified manner, possibly without using the system parameters 50. To check if the lock assembly 78*a* is working in a satisfying manner, the controller 31 may transmit a drive signal to the motor 34 without transmitting a start signal. If the lock assembly 78*a* is configured correctly, the door member 10 shall not be unlocked if not both the drive signal and the start signal is transmitted. Hence, if the door member 10 is opened, the controller 31 is configured to cause an action in order to alert the operator that the lock assembly 78*a* needs reconfiguration.

It is preferred if the lock assembly 78*a* is analyzed during different door leaf angles a. Moreover, it is preferred if the lock assembly 78*a* is tested during both opening and closing.)

Moreover, it may be beneficial to test if different parameters of the lock assembly are fulfilled, for example by checking if a fail secure electric strike is used. Another lock assembly parameter that can be useful for the operator is if the latch reaches a correct position in the electric strike at closed position, this is preferably checked booth at power on and off.

In one embodiment, the controller 31 is configured to control the motor 32 to cause, or try to cause, movement of said door leaf 12 between a shut closed position of said door leaf and a swung open position of said door leaf. The controller 31 is further configured to evaluate if the motor 34 causes movement of the door leaf 12 when the lock assembly is in a locked position. The at least one test parameter is based on the result of the evaluation. Hence, if the motor 34 causes a movement of the door leaf 12 even through the lock assembly is in a locked position, the test parameter thus not fulfill the safety requirement as the lock assembly is wrongly configured and/or installed. If on the other hand, the motor 34 thus not cause a movement of the door lead 12 when the lock assembly is in a locked position the testing parameter fulfils the requirements.

The controller 31 is preferably configured to store data relating to the different allowable maximum and minimum values in the memory 32. These are seen as threshold values. As an illustrative example, turning back to FIG. 6*b*, it is preferred if the controller 31 has saved the data in the fourth and last column, hence the column relating to opening moment, max. values for angles between 0° and 60°. As the controller 31 has determined the test parameter being the max value of the opening moment, this value is compared against the stored maximum threshold value. For example, if the door weight is around 30 kg and the width is around 800 mm, the maximum threshold value for the opening moment is calculated for angles between 0° and 60°.

If the determined test parameter is higher than the maximum threshold value, the safety requirements are not fulfilled and the controller 31 should cause an action to alter the operator about this fact. The control unit 31 is preferably also configured to cause an action if the requirements are fulfilled, in order to inform the operator about the correct installation/configuration.

In one embodiment the motor 32 is driven at a constant velocity. The current supplied to the motor 34 is proportional with the spring force of the compression spring of the forced close arrangement 36. Hence, if the safety requirements are not fulfilled, the automatic door operator 30 could for example be modified by increasing or decreasing the spring force. The controller 31 may thus be arranged to cause an action which informs the operator that the spring force should be increased, decreased or maintained.

Figure 8:
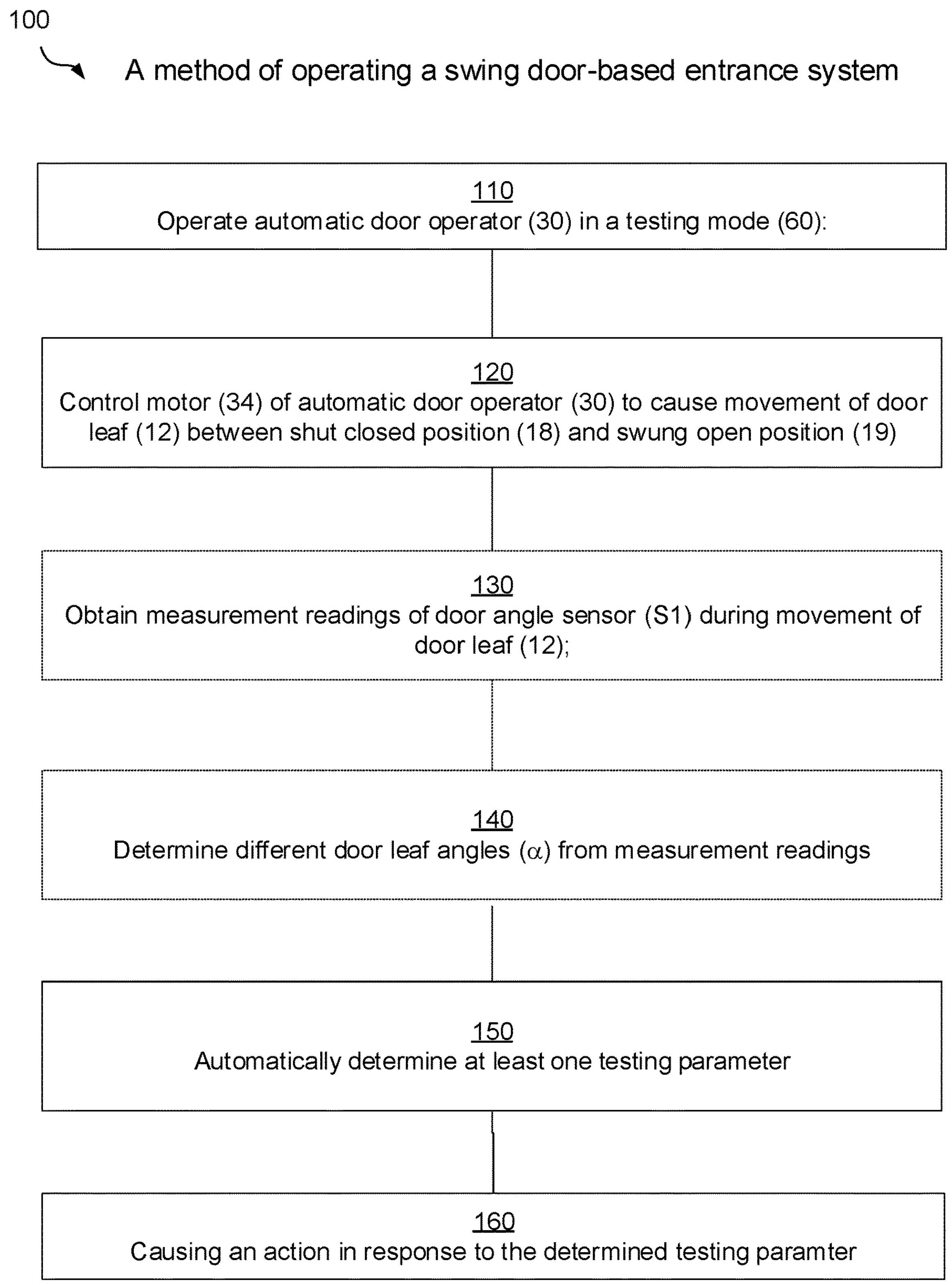
FIG. 8 illustrates a method of operating a swing door-based entrance system according to one embodiment.

The functionality performed in accordance with the present invention as described herein is illustrated as a method 100 in the flowchart diagram shown in FIG. 8. The method 100 first involves operating 110 the automatic door operator 30 in the testing mode 60. The testing mode 60 involves controlling 120 the motor 34 to cause movement of the door leaf 12 between the shut closed position 18 and the swung open position 19 of the door leaf 12. Optionally, the testing mode 60 further involves obtaining 130 measurement readings of the door angle sensor S1 during this movement, and determining 140 different door leaf angles α from the obtained measurement readings.

The testing mode 60 automatically determines 150 at least one test parameter. In a further step, the testing mode 60 causes 160 an action in response to the determined test parameter. This step will soon be described further.

The step of automatically determining 150 at least one test parameter 50 is preferably at least based on the determined door leaf angles α. Additionally, or alternatively, the at least one test parameter 70 is determined based on at least one system parameter 50. The at least one system parameter 50 is pre-stored in the controller 31 and/or manually added to the controller 31 during the testing mode 60. The at least one system parameter 50 relates to the width of the door leaf and/or the mass of the door leaf. The system parameter 50 may further relate to the door closer power size 54.

The least one test parameter may be a parameter relating to the torque of the entrance system. The torque may be an opening torque or a closing torque.

The testing mode 60 may further involve analyzing the at least one determined test parameter against at least one pre-determined threshold. The at least one pre-determined threshold may relate to a maximum or a minimum allowed closing torque or a maximum or minimum allowed opening torque of the entrance system 1.

Turning back to the step of causing 160 an action in response to the determined test parameter. The action caused by the controller 31 differs depending on the value of the test parameter.

If the determined test parameter is below the maximum threshold value, or above the minimum threshold value, that specific test parameter fulfils the safety requirements. In this case, the action should inform the operator/installer that the specific requirement is fulfilled and thus that the installation, configuration or reconfiguration process has been successful for that test parameter.

If the determined test parameter is higher than the maximum threshold value, or lower than the minimum threshold value, the safety requirements is not fulfilled. In this case, the action should inform the operator/installer that the specific requirement is not fulfill, and preferably also inform how to adjust the automatic door operator in order to fulfill the requirements. The feedback of how to adjust the automatic door operator may comprise information of increasing the spring force or decreasing the spring force of the forced close arrangement 36. The feedback could be either that it should be increased or decreased, or be a specified value.

Additionally, or alternatively, the action may be to generate an audible, visible and/or tactile alert to inform the operator, or user, of the output of the testing. In the situation where the lock assembly is tested, the controller 31 need not to compare against threshold values as such. Instead in this situation the threshold value can be seen as a yes or no, or 0 or 1 (representing unlocked or locked for example).

Figure 9:
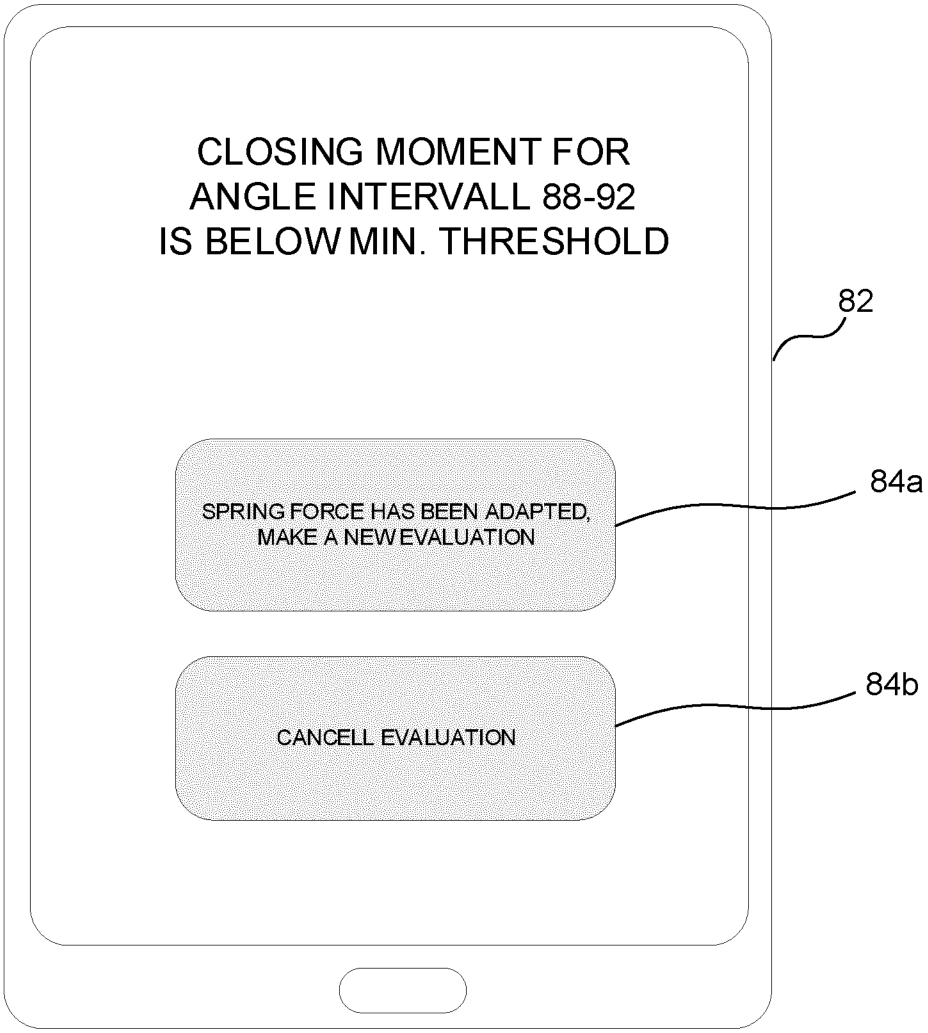
FIG. 9 illustrates a display for presenting test data according to one embodiment.

FIG. 9 illustrates a display 82 being in operative communication with the controller 31. The display 82 may be in the form of a touch sensitive display having a user-friendly interface or a non-touch display being controlled by a keyboard, numpad, buttons or similar device allowing for manual input. The display 82 could also be a touch sensitive display which additionally could be controlled by for example a keyboard and/or buttons arranged on the display or as an external device such as a keyboard.

The display 82 is preferably configured to display and operate one or more virtual keys 84*a-b* on the display 82, which for example allows the operator to input system parameters 50 and/or to select a new calculation of the test parameter after adjustments have been made.

In the illustrative example in FIG. 9, two virtual keys 84*a-b* are present. One key 84*a* may state "spring force has been adapted, make a new evaluation" and thus initiates a new calculation of the test parameter. A second key 84*b* may state "cancel evaluation", which may be used if there for some reason is no more need for a further verification of the system. The input of system parameters 50 may be done by typing in the correct values, or by selecting one value among a plurality of values being displayed.

The display 82 may be arranged as a part of the entrance system 1. In an alternative embodiment, the display 82 is part of an external device that is used by the operator during the testing mode.

The external electronic device may for example be a mobile phone, a tablet, a personal digital assistant, or generally any hand-held, user-carried or user-worn device capable of displaying information and communicating with the control arrangement 20. The communication between such an external device and the controller 31 may be performed by a communication interface.

The invention has been described above in detail with reference to embodiments thereof. However, as is readily understood by those skilled in the art, other embodiments are equally possible within the scope of the present invention, as defined by the appended claims. It is recalled that the invention may generally be applied in or to an entrance system having one or more movable door member not limited to any specific type. The or each such door member may, for instance, be a swing door member, an egress door member, a revolving door member, a sliding door member, an overhead sectional door member, a horizontal folding door member or a pull-up (vertical lifting) door member.

The invention claimed is:

1. An entrance system comprising:

a swing door member having a door leaf, and an automatic door operator having:

a motor capable of causing movement of the door member, a controller for controlling operation of the motor, the automatic door operator being operable in a testing mode and an operational mode, wherein the controller is configured, in the testing mode, to:

automatically determine at least one test parameter; and cause an action in response to the determined test parameter; and a lock assembly connected to a power supply and having a lock type, wherein the lock assembly is configured to put the entrance system in a locked position, and wherein the controller is further configured to:

put the power supply in a power off condition;

put the entrance system in the locked position;

control said motor to initiate a movement of said door leaf between a shut closed position of said door leaf and a swung open position of said door leaf, and evaluate if the motor causes movement of the door leaf while the lock assembly is in the locked position, wherein the at least one test parameter comprises a result of the evaluation, and wherein the result is a determination whether the lock type is a fail-safe lock type or a fail-secure lock type.

2. The entrance system as defined in claim 1, wherein the entrance system further has a sensor unit, the sensor unit comprising a door angle sensor, and wherein the controller is further configured, in the testing mode, to:

cause movement of said door leaf between a shut closed position of said door leaf and a swung open position of said door leaf;

obtain measurement readings of said door angle sensor during said movement; and determine the at least one test parameter at a plurality of different door leaf angles ($\alpha$).

3. The entrance system as defined in claim 2, wherein the at least one test parameter is determined at least based on the determined door leaf angles ($\alpha$).

4. The entrance system as defined in as defined in claim 2, wherein the door angle sensor comprises at least one of:

an accelerometer; and a gyroscope.

5. The entrance system as defined in claim 1, wherein the at least one test parameter is determined based on at least one system parameter.

6. The entrance system as defined in claim 5, wherein the at least one system parameter is pre-stored in the controller and/or manually added to the controller during the testing mode.

7. The entrance system as defined in claim 5, wherein the at least one system parameter relates to a width of the door leaf and/or a mass of the door leaf.

8. The entrance system as defined in claim 1, wherein the least one test parameter is a torque generated by the motor.

9. The entrance system as defined in claim 1, wherein the controller is further configured, in the testing mode, to:

analyze the at least one determined test parameter against at least one pre-determined threshold.

10. The entrance system as defined in claim 9, wherein the at least one pre-determined threshold relates to a maximum or a minimum allowed closing torque or a maximum or minimum allowed opening torque of the entrance system.

11. The entrance system as defined in claim 1, further comprising a linkage connected to the automatic door operator and the door leaf for transferring torque generated by the motor to the door leaf.

12. A method of operating an entrance system which comprises a swing door member having a door leaf, and which furthermore comprises an automatic door operator having a motor capable of causing movement of the door member, a controller for controlling operation of the motor, and a lock assembly connected to a power supply and having a lock type, wherein the lock assembly is configured to put the entrance system in a locked or unlocked position, the method involving:

operating the automatic door operator in a testing mode which involves:

automatically determining at least one test parameter; and causing an action in response to the determined test parameter, wherein the step of automatically determining comprises:

actuating the lock assembly to put the entrance system in the locked position;

controlling said motor to initiate a movement of said door leaf between a shut closed position of said door leaf and a swung open position of said door leaf, evaluate if the motor causes movement of the door leaf while the lock assembly is in a locked position, wherein the at least one test parameter comprises a result of the evaluation, and wherein the result is a determination whether the lock type is a fail-safe lock type or a fail-secure lock type.

13. The method according to claim 12, wherein the swing door member further has a sensor unit mounted to the door leaf, the sensor unit comprising a door angle sensor, and wherein the testing mode further involves, in a step before automatically establishing at least one test parameter:

controlling said motor to cause movement of said door leaf between a shut closed position of said door leaf and a swung open position of said door leaf;

obtaining measurement readings of said door angle sensor during said movement; and determining the at least one test parameter at a plurality of different door leaf angles ($\alpha$).

14. The method according to claim 13, wherein the step of automatically determining at least one test parameter is at least based on the determined door leaf angles ($\alpha$).

* * * * *